United States Patent [19]

Frank

[11] Patent Number: 4,702,309
[45] Date of Patent: Oct. 27, 1987

[54] COLLECTOR FOR LIQUID DROPLET RADIATOR

[75] Inventor: Arthur M. Frank, Plainview, N.Y.
[73] Assignee: Grumman Aerospace Corp., Bethpage, N.Y.
[21] Appl. No.: 891,894
[22] Filed: Aug. 1, 1986
[51] Int. Cl.⁴ .................................... F28D 15/00
[52] U.S. Cl. ........................ 165/104.31; 165/904; 165/41; 244/163
[58] Field of Search .............. 165/104.31, 904, 41; 244/163

[56] References Cited

U.S. PATENT DOCUMENTS

| | | | |
|---|---|---|---|
| 3,239,164 | 3/1966 | Rapp | 244/163 |
| 3,528,216 | 9/1970 | Garrett | 55/15 |
| 3,528,217 | 9/1970 | Garrett | 55/15 |
| 3,596,713 | 8/1971 | Katz | 165/104.13 |
| 4,572,285 | 2/1986 | Botts et al. | 165/104.31 |

OTHER PUBLICATIONS

A. T. Mattick and A. Hertzberg, Liquid Droplet Radiators for Heat in Space, 18–22 Aug. 1980.

*Primary Examiner*—Albert W. Davis, Jr.
*Attorney, Agent, or Firm*—Richard G. Geib; Tick Daniel J.; Bernard S. Hoffman

[57] ABSTRACT

A collector for a liquid drop radiator for cooling at least one fluid droplet stream. The collector has a housing with at least one inlet for the at least one fluid droplet stream and one outlet and lies in a plane, and a pump disposed in the housing and which has a low pressure side and lies in a plane which is the same as the plane that the housing lies in. The at least one inlet of the housing converges towards the pump so that the at least one fluid droplet stream is directed towards the low pressure side of the pump and directed by the pump to the outlet of the housing.

12 Claims, 6 Drawing Figures

COLLECTOR FOR LIQUID DROPLET RADIATOR

BACKGROUND OF THE INVENTION

The present invention relates to a collector for a liquid droplet radiator. More particularly, it relates to a collector for a liquid droplet radiator and which includes a housing and a pump.

The rejection of heat in space is a critical aspect of virtually all proposed space-borne installations, from solar power satellites to low temperature materials processing laboratories. On purely thermodynamic grounds it is desirable to reject heat at as low a temperature as possible, for instance, to maximize efficiency in a power cycle or to minimize the work required to drive a heat pump, and this implies a large radiator area and mass. This obviously conflicts with the basic requirement that any spaced-based installation have minimal mass. The balance between device performance and radiator mass thus forms a central design problem for many space systems.

In most designs the radiator is composed of an array of tubes or tube-fin structures through which flows a coolant. The tubes must be sufficiently massive to minimize micrometeorical penetration; in addition, transport of the coolant over large distances is often required. Radiator mass in such designs often comprises a large fraction of the total system mass.

J. M. Hedgepeth proposed, in "Ultralightweight Structures for Space Power," in Radiation Energy Conversion in Space, Vol. 61 of Progress in Astronautics and Aeronautics, K. W. Billman, ed. (AIAA, New York, 1978), p. 126, the use of a dust radiator to reduce the radiator weight of solar power satellites. A cylindrical column of dust particles is heated radiatively by the working fluid of a thermal engine and is then sent on a 100 m to 10,000 m trajectory to radiate energy into space, and finally is collected, reheated and redirected. While this idea holds promise for sizeable weight reduction, it has significant practical problems, such as the inefficiency of heating the dust by radiation, the difficulty of manipulating a stream of dust, and degradation of the dust itself over time.

The concept of using a stream of liquid droplets as a lightweight radiator for space retains the low-mass advantages of a dust radiator and has the additional advantages of allowing heat transfer by conduction (heat exchanger) and ease of manipulation. To indicate the degree of improvement possible using droplets instead of tube and fin structures to radiate heat, it is noted that radiator performance is characterized primarily by the specific mass, i.e., mass per radiator area. The best tube and fin designs incorporating heat pipes have specific masses of 5–10 kg/m$^2$. The specific mass of a droplet is simply $\frac{4}{3}\rho a$, where a is the droplet radius. Even with a medium as heavy as liquid tin ($\rho=6.8$ g/cm$^3$), which turns out to be an excellent medium for rejection in space thermal engines, the specific mass is 0.1 kg/m$^2$ for 0.1 mm dia droplets, a 50-fold improvement over tube-fin radiators.

Collection and transport of the cooled droplets pose a problem. One elementary collection scheme is taught by A. T. Mattick and A. Hertzberg, in "Liquid Droplet Radiators for Heat Rejection in Space, Conference Energy to the 21st Century, Proceedings of the 15th Intersociety Energy Conversion, Engineering Conference, Seattle, Wash. U.S.A. (Aug. 18–22, 1980). This elementary method of collecting the cooled droplets is shown in FIG. 1. The collector is a rotating drum that forms the drop stream into a continuous liquid by centrifugal acceleration. Pumps spaced symmetrically around the periphery of the drum then pressurize the liquid to overcome the centrifugal force and provide back pressure for the main heat exchanger pump. Only modest rotation speeds (a few rpm) are required to collect the liquid for drum diameters above a meter. However, the need for a drum of this size, can prove to be disadvantageous, both in weight and space. Also, insertion of liquid into the rotating collector does present an additional technical complication. Furthermore, a rotary drum collector is not compatible with a sheet of droplets having a long width.

SUMMARY OF THE INVENTION

Accordingly, it is an object of the present invention to provide a collector for a liquid droplet radiator which avoids the disadvantages of the prior art.

More particularly, it is an object of the present invention to provide a collector for a liquid droplet radiator, which is compact, lightweight, and efficient.

In keeping with these objects, and with others which will become apparent hereinafter, one feature of the present invention resides, briefly stated, in a collector for a liquid drop radiator for cooling at least one fluid droplet sheet and having a housing with at least one inlet for the at least one fluid droplet sheet and one outlet and lying in a plane, and a pump disposed in the housing and having a low pressure side and lying in a plane which is the same as the plane that the housing lies in, wherein the at least one inlet of the housing converges towards the pump.

When the collector for a liquid droplet radiator is designed in accordance with the present invention, the at least one fluid droplet sheet is directed to the low pressure side of the pump and directed by the pump to the outlet of the housing.

In accordance with another feature of the present invention, the housing includes a center portion of the housing lying in a plane and having opposing sides and at least one extremity having at least two portions and diverging from the center portion and lying in a plane which is the same as the plane that the center portion lies in.

Another feature of the present invention is that the pump is disposed in the center portion of the housing.

Yet another feature of the present invention is that the center portion of the housing contains a pressure relief groove and pressure relief holes for lubrication and pressure relief.

Still another feature of the present invention is that the at least one inlet is defined by at least two portions of the at least one diverging extremity of the housing.

Yet still another feature of the present invention is that the at least one extremity includes two extremities.

Still yet another feature of the present invention is the at least one fluid droplet sheet includes two fluid droplet sheets.

Still yet another feature of the present invention is that it further comprises means for wetting the at least one extremity of the housing so that the at least one fluid droplet sheet adheres to the at least one extremity as the at least one fluid droplet sheet converges towards the pump.

Another feature of the present invention is that the at least one extremity is wetted by the same fluid as the at least one fluid droplet sheet.

Yet another further feature of the present invention is that the wetting means include at least one tubular manifold.

Still yet another feature of the present invention is that the two extremities converge to the opposing sides of the central portion of the housing.

Finally, still a further feature of the present invention is that it includes a divider plate for attaching in tandem the collector to another collector.

The novel features which are considered characteristic for the invention are set forth in particular in the appended claims. The invention itself, however, both as to its construction and its method of operation, together with additional objects and advantages thereof, will be best understood from the following description of specific embodiments.

DETAILED DESCRIPTION OF THE PREFERRED EMBODIMENTS

The present invention uses passive collection on a surface with or without a separate film flow. However, analysis showed that the droplet film would have a very low dynamic pressure head so that incorporation of a closely coupled positive displacement pump is necessary. Also, baselined is a rectangular sheet for maximum area for heat rejection and to eliminate the complication of a focusing generator design. A rectangular sheet required a linear collector. The gear pump/collector concept was therefore evolved. It is linear and scalable to any length within the structural constraint of a maximum gear span between bearing supports.

Figure 1:
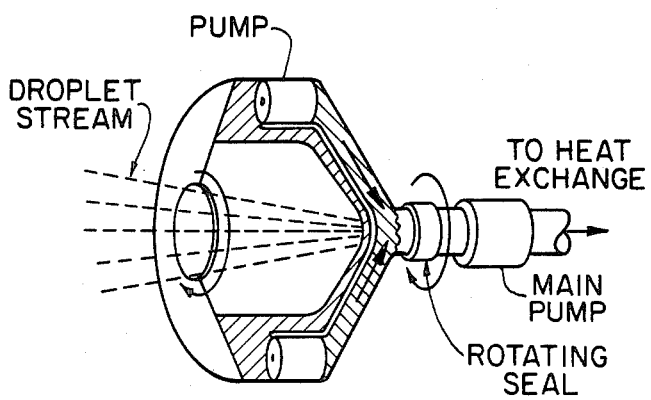
FIG. 1 is a perspective view of a liquid droplet collector of the prior art.
Figure 2:
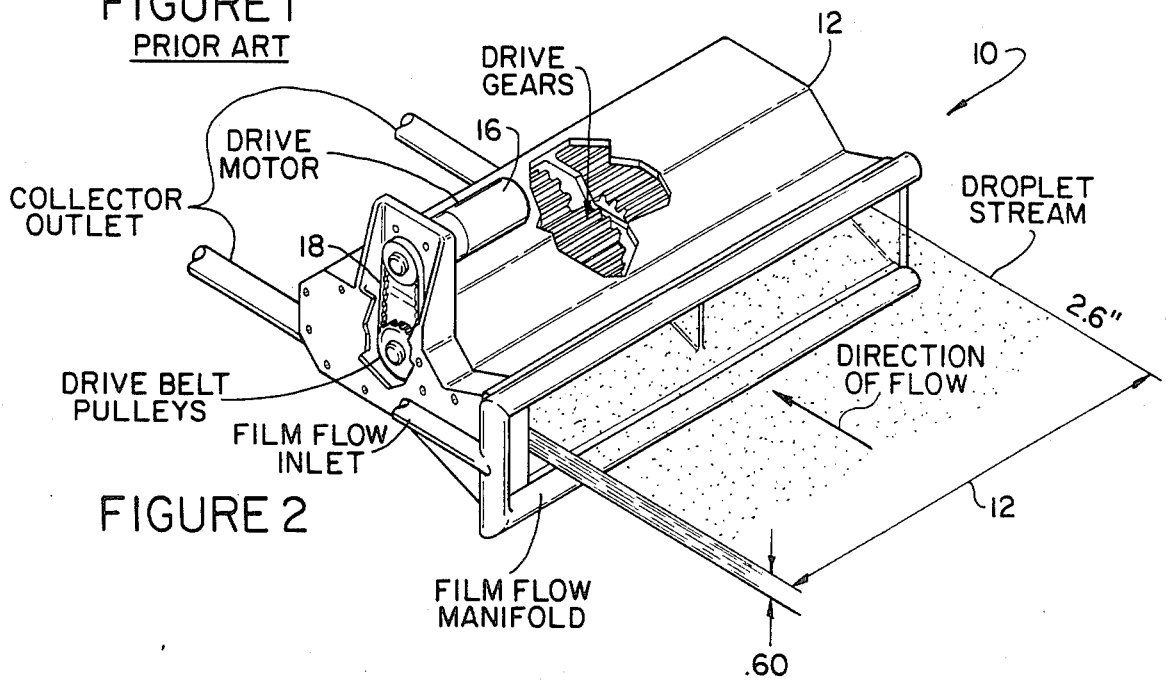
FIG. 2 is a perspective view of the collector for a liquid droplet radiator of the present invention.

The linear collector of the present invention is shown in FIG. 2. The width of the collector is 12 in. The body of the pump houses two sets of spur gears that mate to form a positive displacement pump that pressurize the captured droplet sheets. The intake of the pump is formed with flat surfaces making a 20 deg. angle to the horizontal. The opening of the pump is large enough to capture the sheets even if the sheets deviates from the centerline. The stream may deviate due to dispersion or by sudden spacecraft movements.

At the end of the collector throat there is a narrow opening of about 0.125 in. The 20 deg. angle is chosen because the droplet scatter or splash would be less than 1 in $10^8$ if the droplet sheets impinged at this angle even for droplet velocities of up to 15 m/sec.

The pump is belt driven by an overhead vacuum rated motor. For the selected component sizes, the maximum pump rpm is about 230 rpm delivering about 6 gpm of liquid.

As seen in FIG. 2, film flow manifolds are attached to the collector walls and by means of its integral nozzles supply a flowing liquid film over the collector surfaces when required. While FIG. 2 shows the film flow nozzles located well upstream of the sheets impingement region, film flow considerations may dictate a location closer to the impingement region. The film flow is controlled by a regulating valve. The discharge port of the collector is about 1 inch in diameter.

The droplet sheets have a velocity of 5 m/sec and is 12 in. in width and 0.6 in. in height. There is 15 sheets with 500 holes per layer and the droplet diameter is 0.008 in. The total number of holes =7,500 at 0.004 in diameter and droplets per sec per hole =9,230. The number of droplets entering the collector per sec =$69.2 \times 10^6$.

The collector pump speed without film flow =230 rpm while the inlet flow from the droplet generator is 4.8 gpm. The horsepower without film flow is 0.1 at 80% mech and 80% volumetric efficiency. The estimated maximum film flow is 3 gpm and the outlet pressure is 20 psia.

Figure 3:
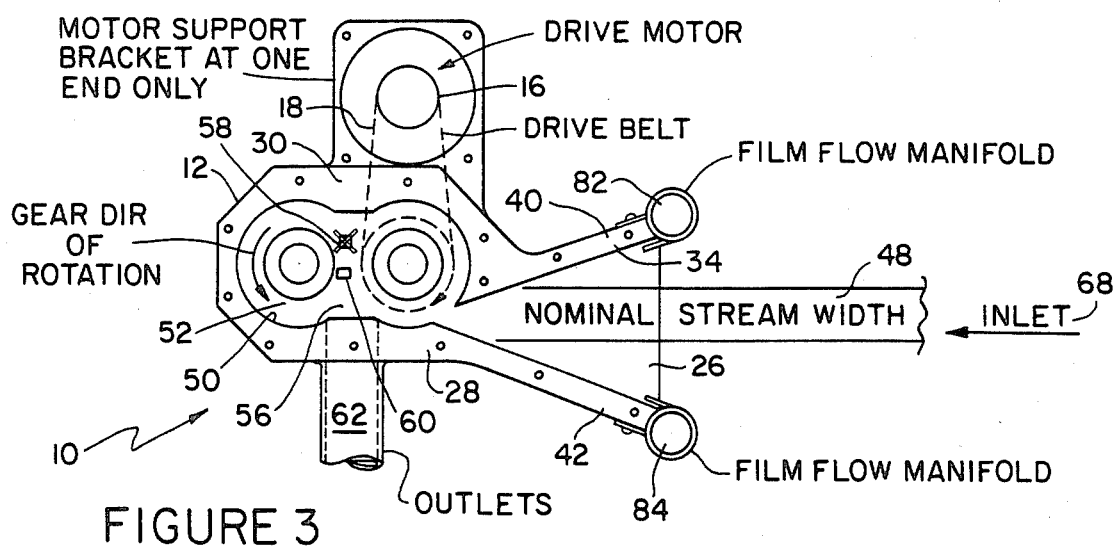
FIG. 3 is a side view of the collector for a liquid droplet radiator of the present invention shown in FIG. 2.

Referring now to FIGS. 2 and 3, the collector for the liquid droplet radiator of the present invention is shown generally at 10 and includes a collector 12, and a motor 16.

The motor 16, by a belt 18, is connected to the collector 12. The motor 16 drives the collector 12.

The collector 12 is shown in FIG. 3. A center body 28 is disposed intermediate side plates 26 of the collector 12. The center body 28 includes a central portion 30 and an extremity 34 on the side thereof. The extremity 34 lies in the same plane as the central portion 30. The extremity 34 includes an upper portion 40 and a lower portion 42. The extremity 34 is connected to and diverges (typically at 20°) away from the central portion 30 of the collector 12. The diverging extremity 34 together with the side plates 26 form an inlet channel 48 that leads into a cavity 50 of the central portion 30 of the collector 12. Within the cavity 50 of the central portion 30 of the collector 12 are disposed a pair of meshed gears 52 and 54. The meshed gears 52 and 54 form a pumping arrangement 56. The pumping arrangement 56 lies in the same plane as the central portion 30. Within the pumping arrangement 56, disposed intermediate the meshed gears 52 and 54, are disposed pressure relief holes 58 and a pressure relief groove 60 whose outputs lubricate and recirculate back into the pumping arrangement 56. An outlet channel 62 is disposed in the lower portion of the central portion 30 of the collector 12.

Film flow manifolds 82 and 84 are attached to the free ends of the extremity portions 40 and 42, respectively, so as to provide an arrangement that would "wet" the inlet channel sides of the extremity portions 40 and 42. The "wetted" surface of the extremity portions 40 and 42 provide better adhesion for the fluid droplet sheets 68 as they enters the inlet channel 48.

In operation, fluid droplet sheets 68 enter the inlet channel 48 and approach the pumping arrangement 56 where they are collected. The film flow manifolds 82, 84 "wet" the extremity portions 40, 42 with the same fluid as the droplet sheet and therefore aid fluid droplet sheet flow. The meshed gears 52 and 54, operated by the motor 16, move the fluid droplet sheets 68 through the outlet channel 62 where they enter the cooling arrangement (not shown) and become recycled. As the fluid droplet sheets 68 enter the inlet channel 48 they may find themselves bumping into and bouncing off the extremity portion 40 and 42 as they find their way down the inlet channel 48. This is reduced by the "wetting" created by the manifolds 82 and 84.

Figure 4:
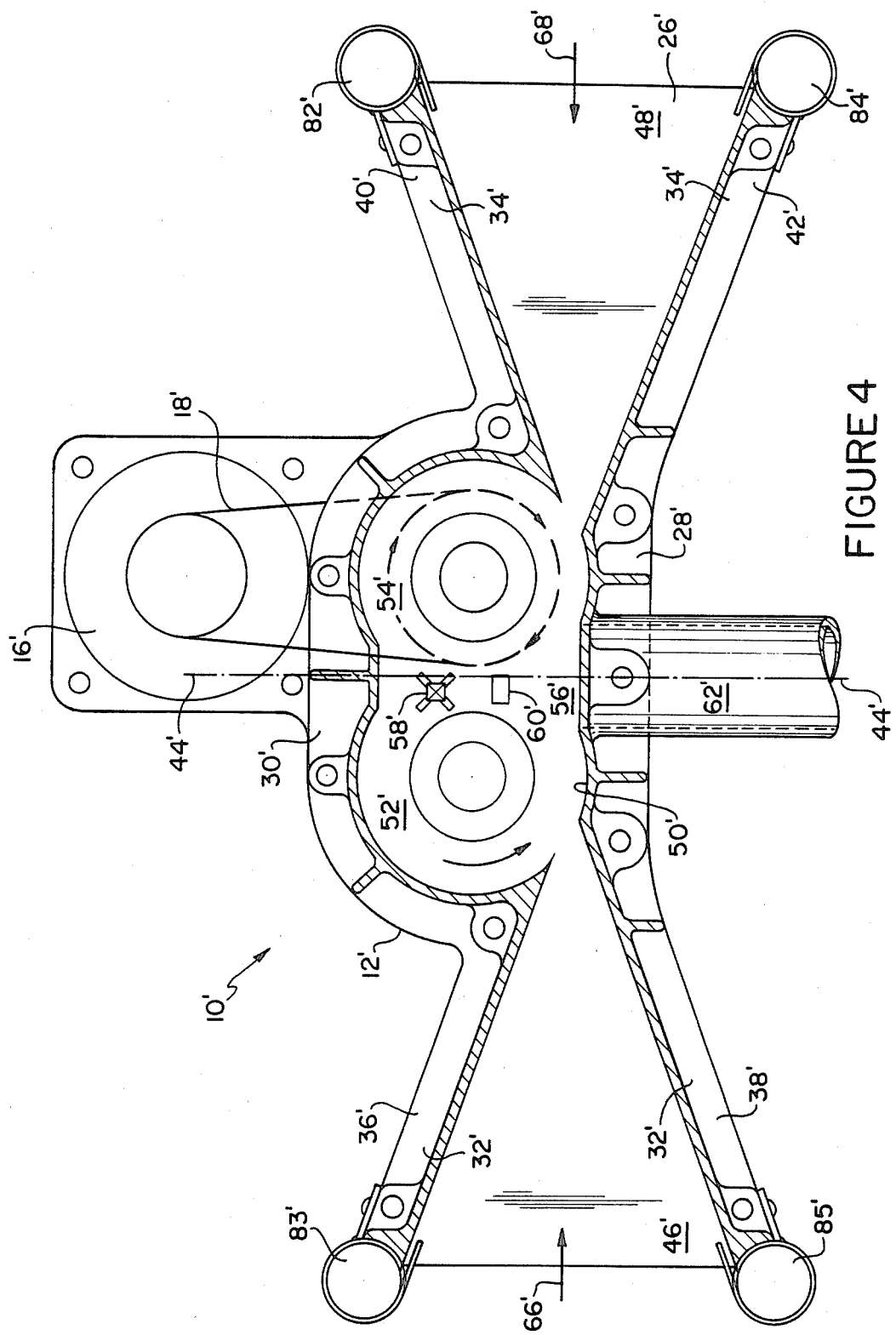
FIG. 4 is a side view of an alternate embodiment of the collector of the present invention.

FIG. 4 shows an alternate embodiment of the present invention by presenting a dual inlet configuration. The collector for the liquid droplet radiator of the alternate embodiment of the present invention is shown generally at 10' and includes a collector 12', and a motor 16'.

The motor 16', by a belt 18', is connected to the collector 12'. The motor 16' drives the collector 12'.

The collector 12' is shown in FIG. 4. A center portion 28' is disposed intermediate side plates 26' of the collector 12'. The center portion 28' includes a central portion 30' and a pair of extremities 32' and 34' on either side thereof. The pair of extremities 32' and 34' lie in the same plane as the central portion 30'. The extremity 30' includes an upper portion 36' and a lower portion 38'. Likewise, the extremity 34' includes an upper portion 40' and a lower portion 42'. The collector 12' is substantially symmetrical with respect to line 44'. The extremities 32' and 34' are connected to and diverge (typically at 20°) away from the central portion 30' of the collector 12'. The diverging extremities 32' and 34' together with the side plates 26' form a pair of inlet channels 46' and 48' that lead into a cavity 50' of the central portion 30' of the collector 12'.

Within the cavity 50' of the central portion 30' of the collector 12' are disposed a pair of meshed gears 52' and 54'. The meshed gears 52' and 54' from a pumping arrangement 56'. The pumping arrangement lies in the same plane as the central portion 30'. Within the pumping arrangement 56', disposed intermediate the meshed gears 52' and 54', are disposed pressure relief holes 58' and a pressure relief groove 60' whose outputs lubricate and recirculate back into the pumping arrangement 56'. An outlet channel 62' is disposed in the lower portion of the central portion 30' of the collector 12'.

Film flow manifolds 82', 84', and 83', 85' and are attached to the free ends of the extremity portions 40', 42', and 36', 38', respectively, so as to provide an arrangement that would "wet" the inlet channel sides of the extremity portions 40', 42' and 36', 38' and provide better adhesion for the fluid droplet sheets 66' and 68' as they enter the inlet channels 46' and 48', respectively.

In operation, fluid droplet sheets 66' and 68' enter the inlet channels 46' and 48' and approach the pumping arrangement 56' where they are collected. The film flow manifolds 82', 84', and 83', 85' "wet" the extremity portions 40', 42', and 36', 38' with the same fluid as the droplet sheets and therefore aid fluid droplet sheet flow. The meshed gears 52' and 54' operated by the motor 16', move the fluid droplet sheets 66' and 68' through the outlet channel 62' where they enter the cooling arrangement (not shown) and become recycled. As the fluid droplet sheets 66' and 68' enter the inlet channels 46' and 48' they may find themselves bumping into and bouncing off the extremity portions 36', 38', and 40' and 42' as they find their way down the inlet channels 46' and 48'. This is reduced by the "wetting" created by the manifolds 82' and 84' and 83', 85'.

Figure 5:
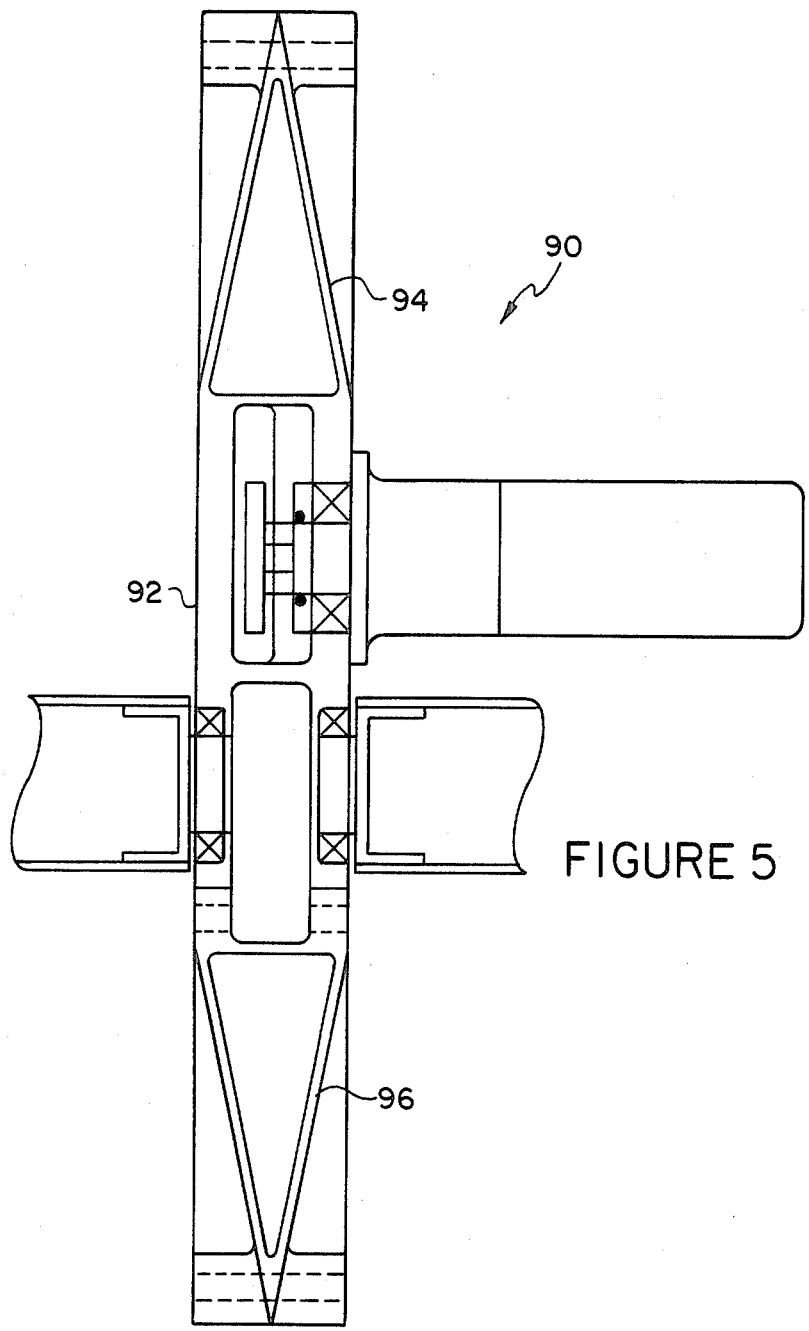
FIG. 5 is a side view of the divider plate of the present invention.

When more than one collector is required, multiple collectors may be assembled in tandem by use of a divider plate as shown in FIG. 5. The divider plate is designated 90 and includes a main body portion 92 and two end portions 94 and 96 that converge away from the main body portion 92.

Figure 6:
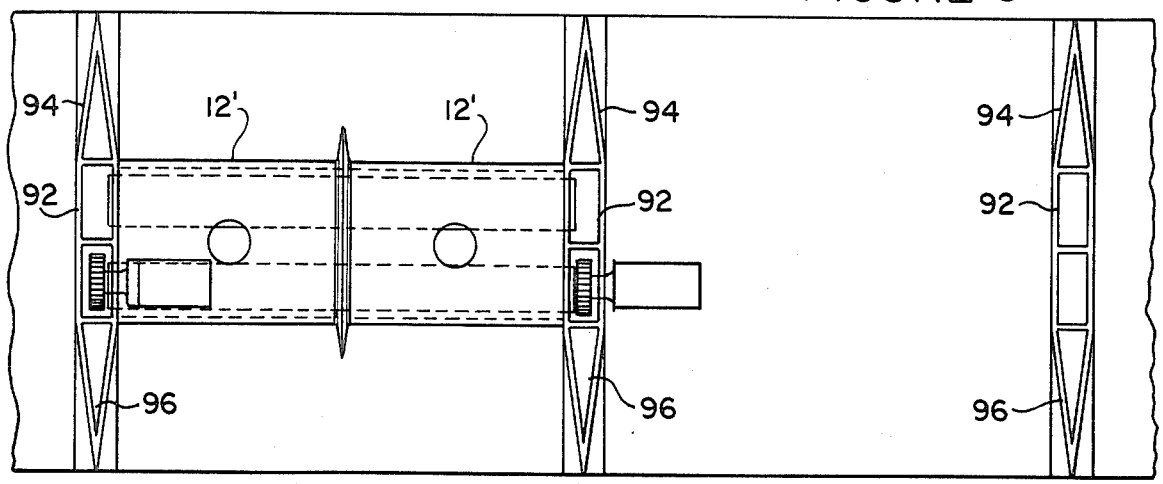
FIG. 6 is a side view showing the divider plate of FIG. 5 in use.

In operation, the divider plate 90 replaces the standard collector side plates 26 and is assembled as shown in FIG. 6. The two end portions 94 and 96 converge so as to capture any stray droplets from the liquid droplet sheets. Any number of collectors may be assembled in tandem using divider plates 90.

It will be understood that each of the elements described above, or two or more together, may also find a useful application in other types of methods and constructions differing from the types described above.

While the invention has been illustrated and described as embodied in a collector for a liquid droplet radiator, it is not intended to be limited to the details above, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

I claim:

1. A collector for a liquid drop radiator, for cooling at least one fluid droplet sheet, comprising:
   (a) a housing having at least one inlet for the at least one fluid droplet sheet and one outlet and lying in a plane;
   (b) a pump disposed in said housing and having a low pressure side and lying in a plane which is the same as said plane that said housing lies in, said at least one inlet of said housing converging towards said pump so that the at least one fluid droplet sheet is directed towards said low pressure side of said pump and directed by said pump to said outlet of said housing.

2. A collector as defined in claim 1, wherein said housing includes a center portion lying in a plane and having opposing sides, said housing having at least one extremity having at least two portions and diverging from said center portion of said housing and lying in a plane which is the same as said plane that said center portion lies in.

3. A collector as defined in claim 2, wherein said pump is disposed in said center portion of said housing.

4. A collector as defined in claim 2, wherein said center portion of said housing contains a pressure relief groove and pressure relief holes for lubrication and pressure relief.

5. A collector as defined in claim 2, wherein said at least one inlet is defined by said at least two portions of said at least one diverging extremity of said housing.

6. A collector as defined in claim 2, wherein said at least one extremity includes two extremities.

7. A collector as defined in claim 6, wherein said at least one fluid droplet sheet includes two fluid droplet sheets.

8. A collector as defined in claim 2; further comprising means for wetting said at least two portions of said at least one extremity of said housing so that the at least one fluid droplet sheet will adhere to said at least two portions of said at least one extremity as the at least one fluid droplet sheet converges towards said pump.

9. A collector as defined in claim 8, wherein said at least two portions of said at least one extremity is wetted by the same fluid as the at least one fluid droplet sheet.

10. A collector as defined in claim 7, wherein said wetting means include at least one tubular manifold.

11. A collector as defined in claim 6, wherein said two extremities converge said opposing sides of said central portion of said housing.

12. A collector as defined in claim 1; further comprising a divider plate for attaching in tandem the collector to another collector.

* * * * *